United States Patent
Varadarajan et al.

(10) Patent No.: US 10,462,135 B2
(45) Date of Patent: Oct. 29, 2019

(54) SYSTEMS AND METHODS FOR PROVIDING CONFIDENTIALITY AND PRIVACY OF USER DATA FOR WEB BROWSERS

(71) Applicant: Intel Corporation, Santa Clara, CA (US)

(72) Inventors: Srikanth Varadarajan, Hillsboro, OR (US); Reshma Lal, Hillsboro, OR (US); Josh Triplett, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 743 days.

(21) Appl. No.: 14/757,659

(22) Filed: Dec. 23, 2015

(65) Prior Publication Data

US 2017/0118215 A1   Apr. 27, 2017

Related U.S. Application Data

(60) Provisional application No. 62/245,407, filed on Oct. 23, 2015.

(51) Int. Cl.
| | |
|---|---|
| *H04L 29/06* | (2006.01) |
| *G06F 16/901* | (2019.01) |
| *H04L 29/08* | (2006.01) |

(52) U.S. Cl.
CPC .......... *H04L 63/10* (2013.01); *G06F 16/9014* (2019.01); *H04L 63/0236* (2013.01);
(Continued)

(58) Field of Classification Search
None
See application file for complete search history.

(56) References Cited

U.S. PATENT DOCUMENTS

| | | | |
|---|---|---|---|
| 2012/0166795 A1* | 6/2012 | Wood | G06F 21/57 713/155 |
| 2012/0210299 A1* | 8/2012 | Pasternak | G06F 9/4493 717/115 |

(Continued)

FOREIGN PATENT DOCUMENTS

| | | |
|---|---|---|
| WO | 2015076846 | 5/2015 |
| WO | 2017069915 | 4/2017 |

OTHER PUBLICATIONS

"International Application Serial No. PCT/US2016/053509, International Search Report dated Dec. 21, 2016", 3 pgs.

(Continued)

*Primary Examiner* — Henry Tsang
(74) *Attorney, Agent, or Firm* — Schwegman Lundberg & Woessner, P.A.

(57) ABSTRACT

Various system configurations and methods for maintaining, accessing, and utilizing secure data of a web browser in a hardware-managed secure data store are disclosed herein. In an example, operations for management of sensitive data such as passwords may be provided with the use of secure enclaves operating in a trusted execution environment. For example, such secure enclaves may be used for sealing and persisting sensitive data associated with a remote service, and transmitting the sensitive data to the remote service, while an unsealed form of the sensitive data is not accessible outside of the trusted execution environment. In further examples, operations for generating a password, storing or updating existing passwords, and replacing web browser input fields with secure data are disclosed.

22 Claims, 11 Drawing Sheets

(52) U.S. Cl.
CPC ........ *H04L 63/0428* (2013.01); *H04L 63/083* (2013.01); *H04L 67/02* (2013.01); *H04L 67/1097* (2013.01)

(56) References Cited

U.S. PATENT DOCUMENTS

| | | |
|---|---|---|
| 2013/0254842 A1 | 9/2013 | Jang et al. |
| 2013/0305392 A1* | 11/2013 | Bar-El .................. H04L 9/08 726/29 |
| 2014/0172721 A1* | 6/2014 | Weiss .................. G06F 21/42 705/64 |
| 2014/0282868 A1* | 9/2014 | Sheller .................. G06F 21/31 726/3 |
| 2014/0325589 A1 | 10/2014 | Rajagopal et al. |
| 2015/0180869 A1 | 6/2015 | Verma |
| 2016/0036826 A1* | 2/2016 | Pogorelik ............. H04L 63/105 726/1 |
| 2016/0330172 A1* | 11/2016 | Muttik ................ H04L 63/0281 |

OTHER PUBLICATIONS

"International Application Serial No. PCT/US2016/053509, Written Opinion dated Dec. 21, 2016", 10 pgs.
"A Primer On Intel Software Guard Extensions (Intel SGX)", (Aug. 2015), 1 pg.
Hoekstra, Matthew, et al., "Using Innovative Instructions to Create Trustworty Software Solutions", (2013), 1-8.
Virus Bulletin, (Jan. 2014) 28 pgs [Online]. Retrieved from the Internet: <URL: https://www.virusbtn.com/virusbulletin/archive/2014/01/vb201401-SGX.
"International Application Serial No. PCT US2016 053509, International Preliminary Report on Patentability dated May 3, 2018", 12 pgs.

* cited by examiner

SYSTEMS AND METHODS FOR PROVIDING CONFIDENTIALITY AND PRIVACY OF USER DATA FOR WEB BROWSERS

PRIORITY CLAIM

This application claims the priority benefit of U.S. Provisional Application Ser. No. 62/245,407, filed Oct. 23, 2015, which is hereby incorporated by reference in its entirety.

TECHNICAL FIELD

Embodiments described herein generally relate to data storage and communication operations in a computer system, and in particular, to the storage and access of user data for a web browser session executed in the computer system.

BACKGROUND

Modern web browsers provide a number of convenience-driven features to store and access sensitive user data, in order to improve the user experience and browser usability. For example, many browsers utilize a password manager to store user name and password values that are used to login to a website. The saved username and password values are then used to auto-fill user name and password fields during the next time that the user accesses the same URL with the browser. In a similar fashion, many browsers store cookies that hold user preferences and website identifiers, store financial information such as credit card numbers and expiration dates, and store other personal information such as addresses, and the like. Such sensitive data that is maintained within client devices is vulnerable to unauthorized access by malicious software, even if the sensitive data is stored and persisted on the computer system in an encrypted format.

In most browsers, security architectures use software sandboxing to isolate web applications running in different browser tabs. Although the web page parsing and rendering operations are sandboxed, the sensitive data that is needed for use with respective web applications is handled by a trusted browser kernel process. When the sensitive data is needed in a web application that is being handled by non-trusted renderer processes, the user data is sent by the trusted browser kernel based on pre-defined security policies. Accordingly, there is the potential that malicious software could access sensitive data values during the access, retrieval, or transmission of previously stored sensitive data values.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
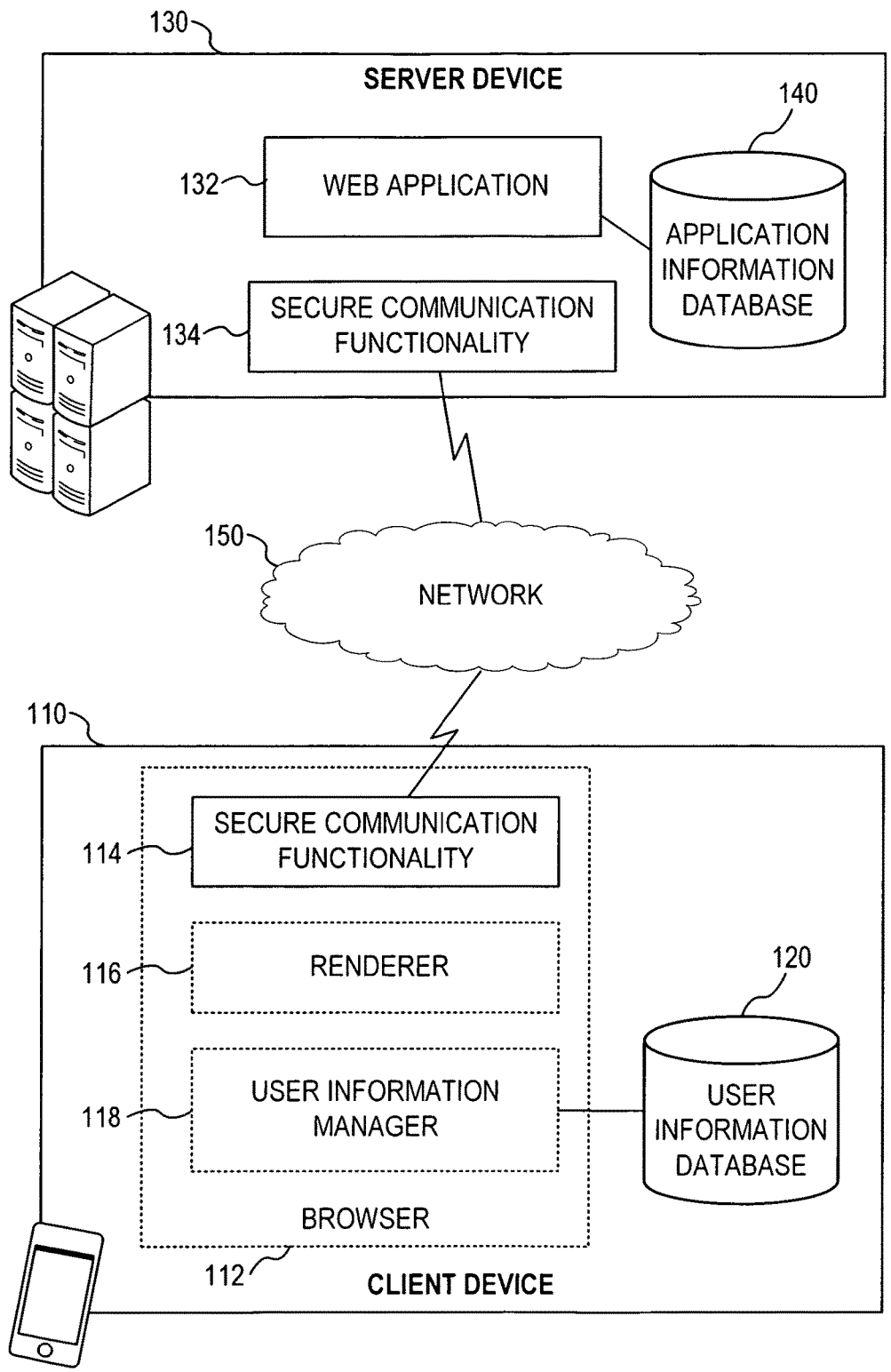
FIG. 1 illustrates an overview of a web browser and a web server operating in a client-server communication environment, according to an example.

In the following description, methods, configurations, and related apparatuses are disclosed that provide for the secure storage of data for use in a web browser and related web applications. Specifically, the following description includes various examples of methods and device configurations that restrict sensitive browser user data accesses to trusted software components running within the browser, and use secure data stores to protect sensitive browser user data.

In one example, the presently described techniques and configurations are applicable to the use of a trusted execution environment (TEE), such as enabled by Software Guard Extensions (hereinafter, "SGX"), for example, the SGX enclaves provided by Intel®-based hardware architectures. SGX is a central processing unit (CPU) feature that provides a secure execution environment for software applications to store and process sensitive data in isolated regions called "enclaves" within the host operating system (OS). SGX may be used to seal data inside of an enclave and to maintain such sealed data in trusted memory locations for the enclave. Among other functions, SGX may be used to protect user data accesses to enclaves dedicated to browser kernel operations. In another example, the presently described techniques and configurations are applicable to the use of ARM® TrustZone® hardware security extensions for ARM-based hardware architectures, and associated TrustZone® trusted software execution and secure data storage and memory management mechanisms. Thus, the references to an "enclave" and a "trusted execution environment" as used herein may refer to many types of secure hardware architectures and configurations.

The following techniques and configurations may be used to isolate browser functionality code and sensitive user data handling to a small trusted portion of browser kernel using a trusted execution environment, and also to restrict the user data flows to interactions with the isolated protected regions of such an environment. The configurations described herein may be used to provide end-to-end security for sensitive user data from the client machine to the web servers. For example, in the case of sensitive passwords, the passwords are not stored or provided in the clear to untrusted browser components such as the renderer, and are not sent in clear in inter-process communication (IPC) messages between renderers.

For existing computer systems, trusted boot techniques may be used to verify that the browser software components loaded from the file system are legitimate. Encryption may also be used by existing computer systems to store user data such as passwords, but such passwords are decrypted and available in clear form during use in the browser. Thus, in existing browsers, the code and data residing in main memory may be vulnerable at run-time to malicious attacks. Additionally, root kit attacks for client devices may provide ways to disable the security features such as sandboxing, and such attacks may use software vulnerabilities in the OS kernel to obtain unauthorized access to user data. Through the presently disclosed storage and access of browser sensitive data in secure enclaves, these security risks may be removed.

Further, with use of the presently disclosed techniques, sensitive data that is persisted and managed in a browser—including sensitive user data such as passwords and credit card data—may be made accessible only to a secure enclave that is protected by the CPU and hardware itself. The user data never exists in the clear in main memory during runtime. No OS or kernel services are trusted with unencrypted forms of the data, preventing any unauthorized access for rootkits.

Additionally, the presently disclosed techniques may be used to enable browser vendors to deliver improved user experiences while maintaining the secrecy and privacy of user data employed in the browser environment. This may include not only secret information such as passwords and credit card information, but also cookies, preferences, session states, site data, and the like, which may be personal to a user or group of users. Further, the presently disclosed techniques may be used to improve user privacy with use of client-side actions, without changes to the ecosystem and infrastructure used in existing websites.

FIG. 1 illustrates an overview of a web browser and a web server operating in a client-server communication environment according to one implementation example. In this environment, the client device 110 accesses a server device 130 over a network 150 (e.g., the Internet). The server device 130 may host a web application 132 on a web page for access by a web browser 112 of the client device 110. The web application 132 hosted by the server device 130 may provide content that is specific to the client device 110, including content from an application information database 140 that may be accessed only through the use of a specific identifier (e.g., cookie value, token), credential (e.g., username/password tuple), or like restrictor.

The client device 110 includes a renderer 116 of the browser 112 to render the web application 132, such as to render applicable graphics, scripting, and markup language that defines usable multimedia output for the client device 110. The communication session between the client device 110 and the server device 130 via the network 150 may include the use of client-based secure communication functionality 114 and server-based secure communication functionality 134. For example, the secure communication functionality 114, 134 may jointly establish an encrypted session to prevent eavesdropping or interception as communications are sent over the network 150. The information that is communicated from the browser 112 to the web application 132 may include information specific to a user or client device obtained from a user information database 120, including the aforementioned specific identifier, credential, or restrictor.

A user information manager 118 may be provided in the browser 112 to access the information in the user information database 120. For example, the user information manager 118 may retrieve a username and password tuple or identifier that is used to access content from the application information database 140 via the web application 132. As discussed herein, the user information database 120 may include the sensitive data stored in or protected by (e.g., encrypted by) hardware-based secure enclaves. As further discussed herein, enhancements and modifications may be implemented to the user information manager 118, the renderer 116, and the secure communication functionality 114 of the browser 112 to securely retrieve and communicate the information from the user information database 120 to the server device 130. Such communication may be performed without exposing the sensitive data to any untrusted portions of the browser 112 or the client device 110.

The following techniques are described based on the example of password management in browsers, enabling the persistence and retrieval of username/password credentials to access restricted or customized functions and application information from web sites. It will be understood, however, that the following flows also are applicable to other types of browser data operations and browser data values, which involve or lead to the use of sensitive data.

Figure 2:
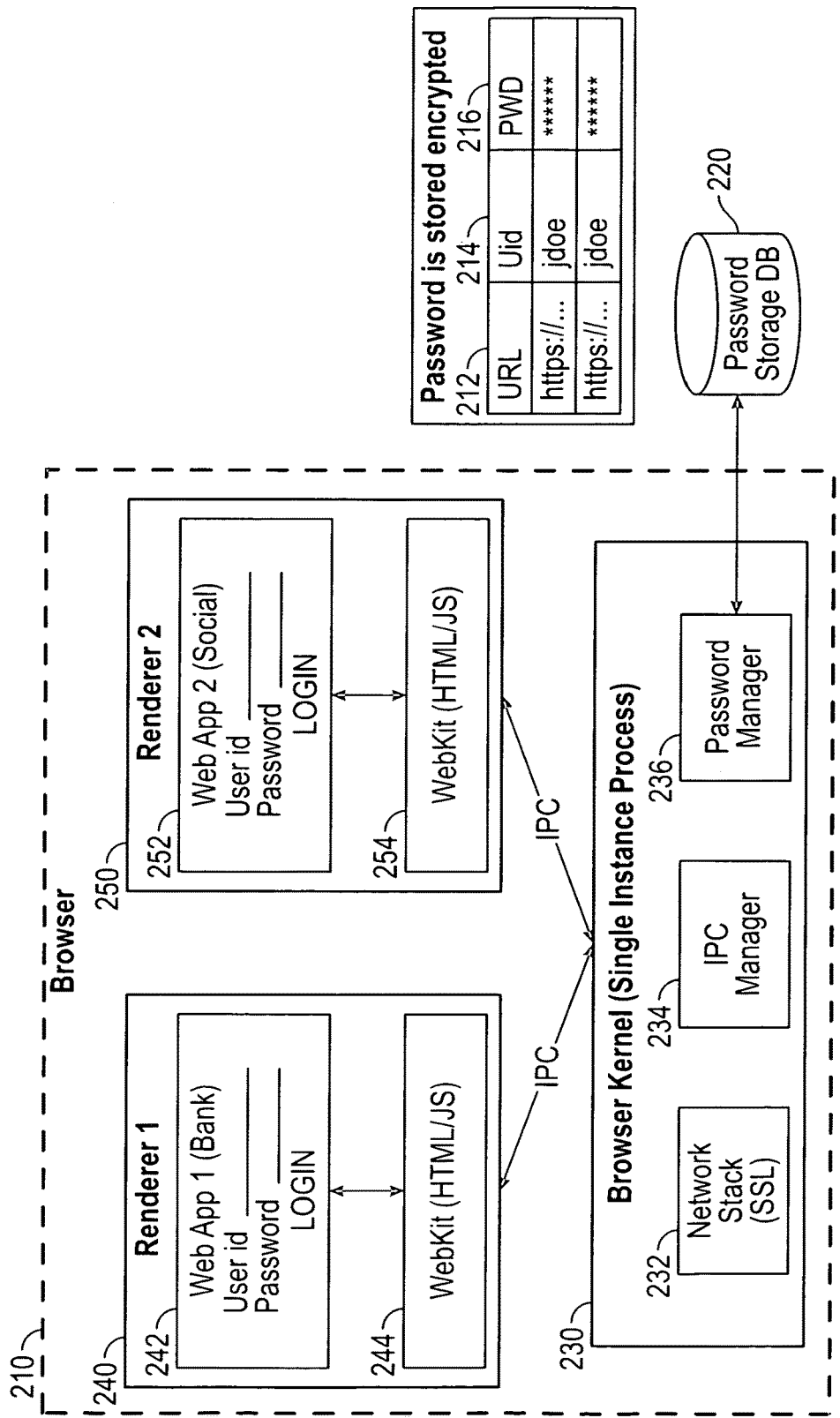
FIG. 2 illustrates an overview of software components within a web browser, according to an example.

FIG. 2 provides an illustration of software components within a web browser 210, in an environment supporting renderer sandboxing according to one implementation example. The renderer is the software process that runs the HTML and JavaScript engines and is responsible for rendering of web page output on a screen. In a typical browser, such as browser 210, each web page is processed in its own renderer process. Each renderer process is typically isolated in its own software sandbox to prevent effects of a security vulnerability on others. As shown, two renderers, a first renderer 240 and a second renderer 250 are used in this example to respectively generate the display of a banking web app 242 and a social web app 252, and generate associated functionality for the web apps 242, 252 based on respective HTML markup and JavaScript scripting that is interpreted by a respective layout engine 244, 254.

The browser kernel 230 includes a set of software components that may operate to service the different renderer instances running in the system. Example of services include a Secure Sockets Layer (SSL) communication manager 232, IPC manager 234, password manager 236, cookie manager (not shown), and the like. In one example, the browser kernel 230 may be implemented as a set of binaries distributed as part of the browser 210 and inherently trusted by the browser vendors. In an example, most of the user data, if not for client-side JavaScript processing, is accessed and managed by the browser kernel 230.

The IPC manager 234 operates as a software component running as part of the browser kernel 230 and is responsible for message exchange between the renderer instances 240, 250 and the browser kernel 230. The password manager 236 operates as a software component running as part of the browser kernel 230, and is responsible for managing (and, in some examples, auto-filling) password fields in forms, saving and retrieving user passwords from a database or other storage location (e.g., storage memory), encrypting user passwords, and the like. The SSL communication manager 232 also operates as a software component running as part of the browser kernel, and is responsible for establishing secure connections between client and web servers using a SSL/Transport Layer Security (TLS) protocol.

As shown in FIG. 2, a password storage database 220 may be configured to operate as a client-side password database storing user data such as user passwords. For example, the password database may store data as a 3-tuple data set (URL 212, User ID 214, Encrypted Password 216). It will be understood that additional credential formats and credential Mg information may be associated with user access to a particular website or web application.

Figure 3:
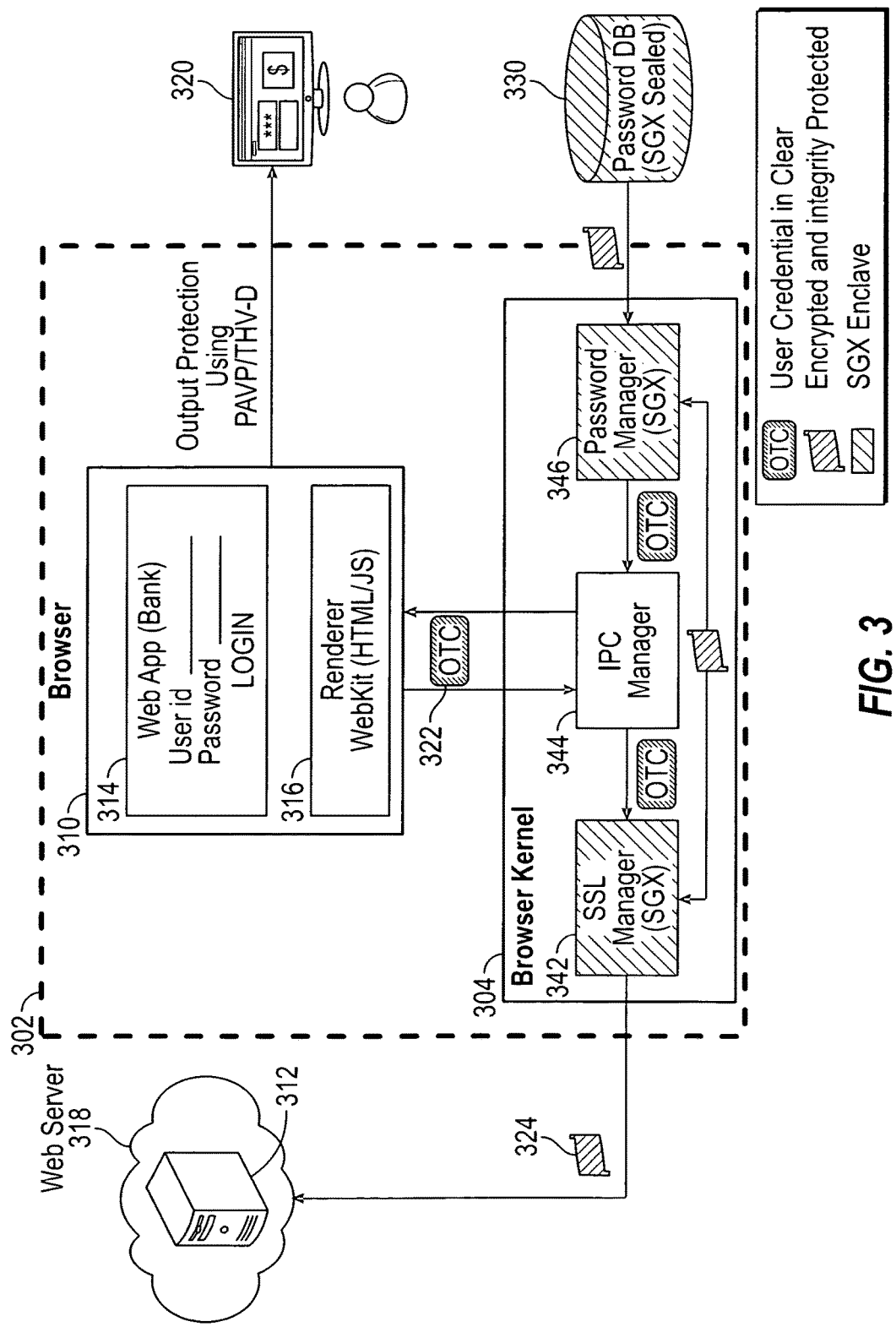
FIG. 3 illustrates a block diagram of components and communication operations for maintaining browser data with use of a secure enclave, according to an example.

FIG. 3 illustrates a block diagram of components and communication operations for maintaining browser data with use of a secure enclave, according to one implementation example. In this configuration, the software components that access user passwords within the browser kernel 304 of a browser 302 are partitioned to operate within secure enclaves. For example, a password manager 346 and secure communication components, such as a SSL manager 342, may be run as secure code within secure enclaves, and the communication between the two managers 342, 346 are made secure using a secure channel that is established using local attestation amongst the two enclaves. Accordingly, secure enclaves may be used to handle and store both sensitive user data (e.g., passwords, cookies, two-factor authentication values, cached site data, form data, and the like), as well as execute secure code (e.g., code for the SSL communication stack in the SSL manager 342 and code for the password manager 346 to provide retrieval of the sensitive user data).

The secure enclave hosting the SSL manager 342 also may be used to implement confidentiality within the browser 302 for server certificate validation and session shared secrets for a network communication 324 with a web server 312. Such validation and session shared secrets may be protected within the secure enclave to ensure a secure (and secret) communication tunnel between the web server 312 and the client device operating the browser 302 (in addition to being secure relative to other actors in the network 318 (e.g., the Internet)). Accordingly, the network communication 324 transmitted from the browser 302 to the web server 312 may include user credentials that are not only encrypted but also integrity protected.

In a further example, the cookies that are used for session maintenance for future logins to the same URL, also may be sealed to the enclave hosting the SSL manager 342 to prevent offline tampering. In an example, sealing is a feature of secure enclaves, where the data is encrypted within an enclave using a key known only to code executing within that specific enclave on that specific CPU. Thus, other credentialing information specific to the web server 312 and the client device or browser 302 may also be securely maintained and persisted using the SSL manager 342.

In one example, passwords for a web application 314 (e.g., for the web application 314 that is served from the web server 312 and is rendered to an output device 320) may be stored in a password database 330 as a tuple of URL/User ID/Password information, where the password is encrypted while the URL and User ID are accessible to the browser and stored in the clear (unencrypted). In some examples, the password database 330 may be configured to store other sensitive information (e.g., user information) in addition to a URL, User ID, and password value.

It would be an expected attack for malware or other malicious software to try to modify a tuple of secure data by modifying the URL or User ID in an attempt to attempt unauthorized access to the password. To protect against this type of tampering, a hash of the tuple (e.g., a hash of all three values) may be stored in a tamper resistant way, along with the tuple, to validate the data values of the tuple.

Figure 4:
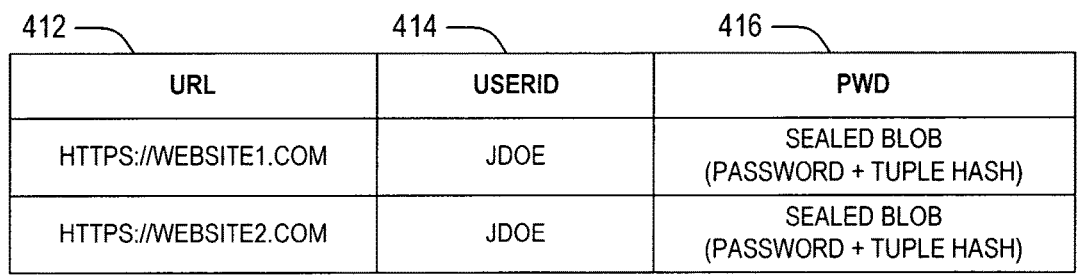
FIG. 4 illustrates a data structure for storage of browser data with use of a secure enclave, according to an example.

FIG. 4 illustrates a data structure for storage of browser data with use of a secure enclave, according to one implementation example. As shown, this data structure depicts one implementation to append the tuple's hash to the password (Password+Hash), seal the combined value (Password+Hash) to the enclave (e.g., creating a binary large object, or BLOB), and then store this modified data set 416 in a password database using standard methods. When the tuple is retrieved, the hash is computed over the tuple, and checked and verified against the hash that was sealed by the secure enclave. Such encryption and verification, performed by a trusted process in a secure enclave, prevents malware from sniffing the password, and any improper modification to the URL 412 or User ID 414 will be detected.

Returning to FIG. 3, the password manager 346 may use data sealing to protect the password record from tampering and store the tamper-proof binary object (e.g., in the format described above) in the password database 330 (e.g., in a non-secured database). Further, the password manager 346 handles any unencrypted form of the password record in a secure enclave to prevent the password or any other protected data from interception and tampering. (In another example, the entire password database 330 may be sealed by the secure enclave and stored within an encrypted storage location, thus being locked to the secure enclave).

In an example, when the web application 314 that is rendered by the renderer process 316 of the browser 302 (being rendered to the output device 320) requests a password for autofill purposes, the password record from the password database 330 is read, integrity verified, and decrypted within the secure enclave operating the password manager 346, thus, conducting all sensitive operations within a trusted execution environment. In an example, instead of sending the clear password to a renderer process 316 via an IPC manager 344 for inclusion in the web application, the password manager 346 generates a One-Time Code (OTC) token 322 to substitute as the password and communicates this OTC token 322 to the renderer process 316 via the IPC manager 344. The OTC token 322 may have to satisfy some of the properties of the password (such as password length) for client script verification in the renderer process 316.

In an example used for the access of a stored password, the renderer process 316 fills the password field on the web application 314 with the OTC token 322, so that when a user submits the form in the browser rendered output 310, the OTC token 322 is communicated to the SSL manager 342. The SSL manager 342 exchanges the OTC token 322 for the actual password through a secure channel with the secure enclave operating the password manager 346, and then the SSL manager 342 communicates the actual password in the TLS encrypted session with the web server 312. Thus, the password is never accessible in the clear in any untrusted portions of the browser 302, increasing the security of user data.

In some existing browsers, a "master password" or other user credentials may be required to access a password manager, requiring the user to enter the master password to enable the retrieval and use of saved passwords. In a similar fashion, credentials such as a login token obtained from a cloud service may need to be presented by a user before accessing sensitive data from an encrypted profile. The presently disclosed techniques for secure storage and communication of sensitive data may also be used in combination with a master password, user credentials, or other security techniques that provide an additional authentication mechanism to access the secure data.

In existing browser configurations that employ a master password, the use of restricted access and encryption only locks the data, at rest, so there remains a possibility for a plain text password or other sensitive data to be exposed when the master password is entered or the profile is authenticated. (This is a further issue with any type of a passphrase or other sensitive data that a user enters into a browser that may be replayed, or captured and substituted.) However, the use of existing master password and credential authentication techniques along with secure enclaves may add a layer of security to the storage of such data and decrease the potential of unintentional access (e.g., physical access) to such sensitive data.

Figure 5:
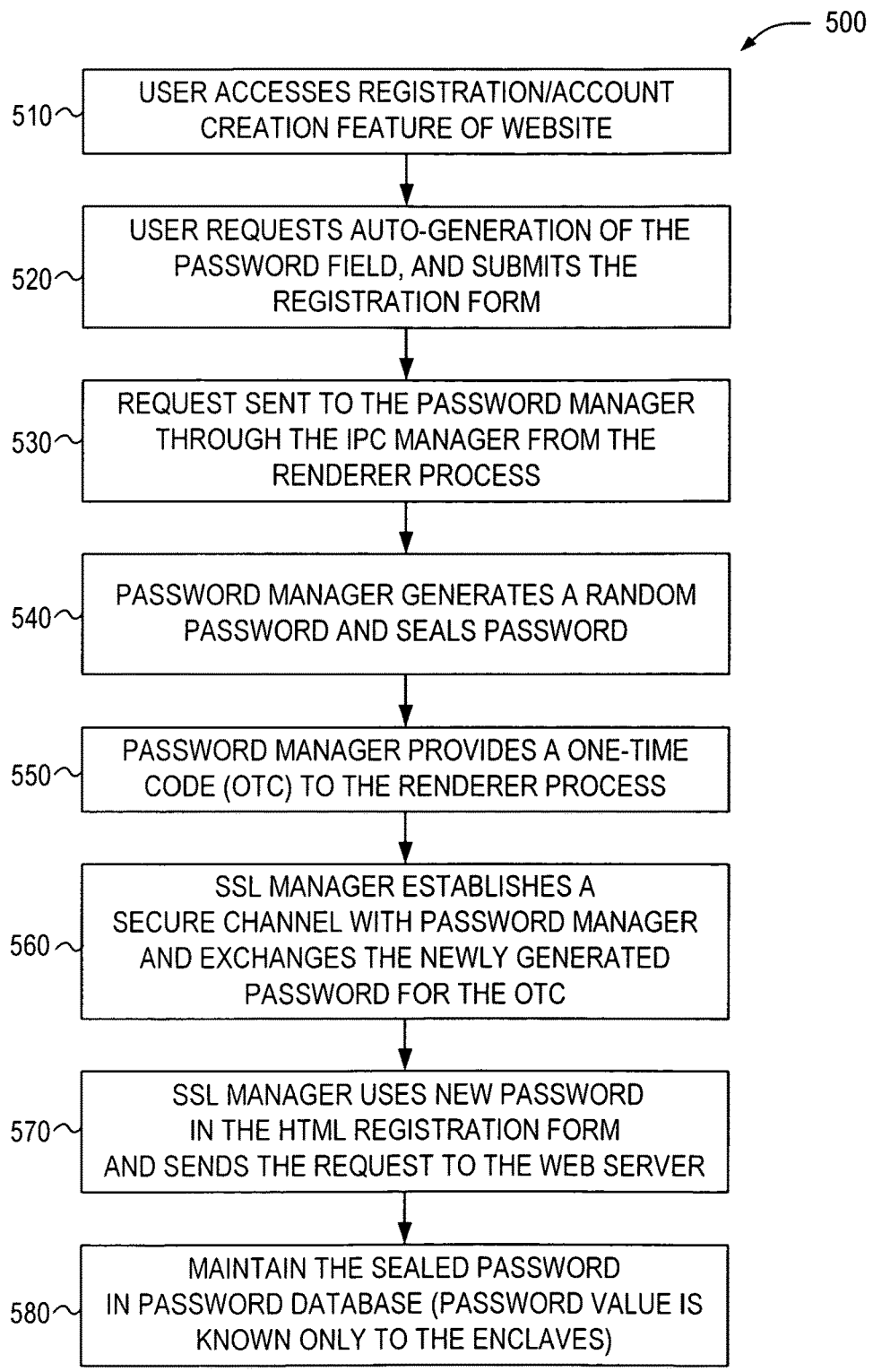
FIG. 5 illustrates a flowchart of data flow operations performed in a web browser for user login with creation of a new password, according to an example.

FIG. 5 illustrates a flowchart 500 of a data flow operations performed in a web browser for user login, according to an implementation example. For example, the data flow illustrated in flowchart 500 may be used with a first time login to a web site, such as creating a new password during a registration or signup of a service hosted by a specific website.

A user accesses the registration page of a URL in a web browser, such as a banking website (operation 510). The user inputs (e.g. types) the User ID information, and may enter values to various other fields into a fillable web form. The user then requests auto-generation of the password field within the website (e.g., using features of the browser), and submits the registration form (operation 520).

A request is sent to a password manager (operating in a secure enclave) from the browser renderer process through the IPC manager (operation 530). The password manager, operating in a secure enclave, generates a random password and seals the password to the secure enclaves (operation 540), and sends a one-time code (OTC) token to the browser renderer process (operation 550).

In response to the user submitting the registration form in the browser, a SSL manager (operating in a secure enclave) establishes a secure channel with the password manager and exchanges the newly generated password for the OTC token (operation 560). The SSL manager inserts this new password (an unsealed/unencrypted form of the new password) into the values communicated for the webpage registration form (e.g., HTML form) and sends (e.g., forwards) the request to the web server over a secure connection (operation 570). If the registration is successful, the newly generated sealed password may be maintained (e.g., persisted in storage memory) within a password database (operation 580). At this point, the unencrypted value of the newly generated random password is known only to the secure enclaves (and only accessible to the SSL manager, password manager operating in the secure enclaves) and may be securely stored (e.g., being sealed in an encrypted form) in the password database.

Figure 6:
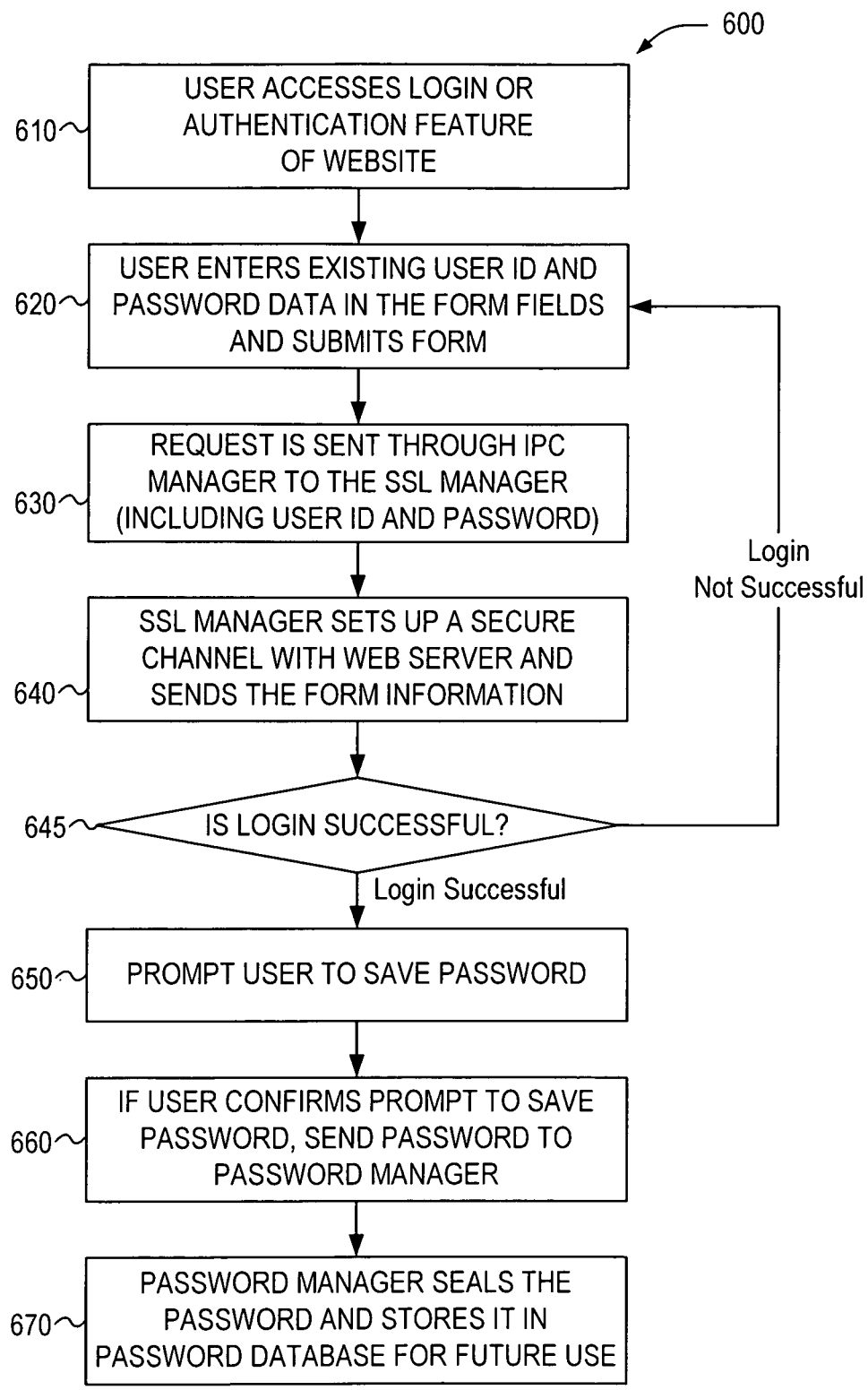
FIG. 6 illustrates a flowchart of data flow operations performed in a web browser for user login with saving of an existing password, according to an example.

FIG. 6 illustrates a flowchart 600 of data flow operations performed in a web browser for user login, according to an implementation example. For example, the data flow illustrated in flowchart 600 may be used with saving a pre-existing password used to access a service hosted by a specific website, thus supporting a legacy flow of existing website services.

A user opens a login page of a website via a URL, such as a banking website (operation 610). The user inputs (e.g., types) an existing User ID and Password data in the form fields and submits the login form (operation 620).

A request is sent through the IPC manager to the SSL manager (operation 630). The request contains the password in the clear from the renderer process to the IPC manager. Because since this is a one-time step in the save password flow, such operation may be considered low risk. The SSL manager, operating in a secure enclave, then establishes a secure channel with the web server and sends the login form information (operation 640).

If the login to the website is successful (decision 645), the user is prompted to save the password (operation 650). (If the login to the website is unsuccessful, operations 620-640 may be repeated.) If the user confirms the prompt to save the password, the password value is securely sent to the password manager (operation 660). The password manager, operating in the secure enclave, then seals the password and stores it in the password database (e.g., in an encrypted format) for future use (operation 670).

Figure 7:
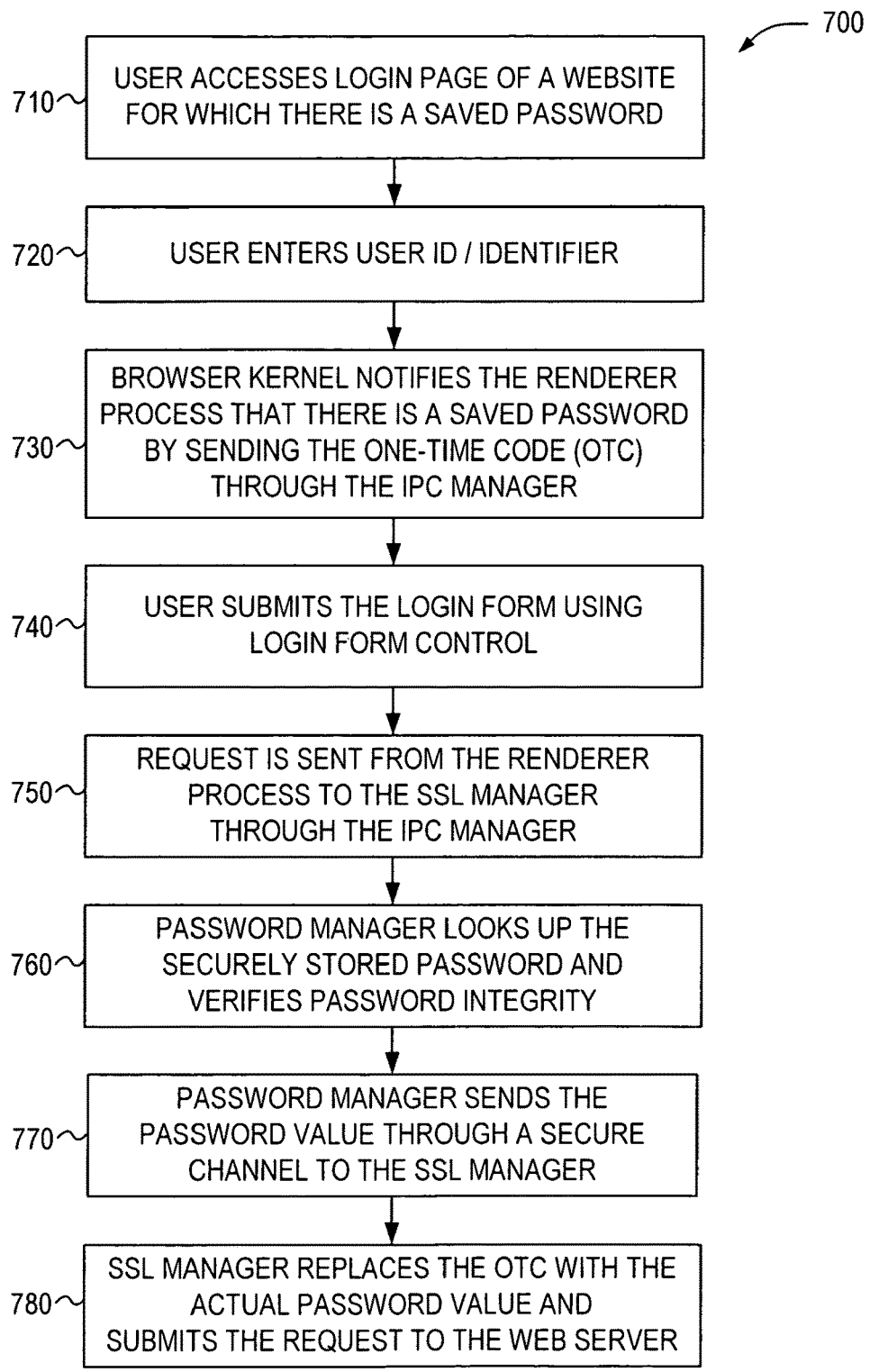
FIG. 7 illustrates a flowchart of data flow operations performed in a web browser for user login with retrieval of a saved password, according to an example.

FIG. 7 illustrates a flowchart 700 of data flow operations performed in a web browser for user login, according to an implementation example. For example, the data flow illustrated in flowchart 700 may be used in connection with re-visiting the web site for which a password was saved, to access a service hosted by a specific website.

First, a user accesses the login page of a URL for which there is a saved password (operation 710) (e.g., created and saved with the data flows of FIG. 5 or saved with the data flows of FIG. 6 described above). The user inputs (e.g., types) the User ID information or selects the applicable identifier (operation 720).

The browser kernel notifies the renderer process that there is a saved password by sending the one-time code (OTC) token through the IPC manager (operation 730). The actual plaintext (e.g., unsealed, unencrypted) password is not sent in the clear. The user then submits the login form, using the login form control on the website (operation 740). A request is sent from the renderer process to the SSL manager through the IPC manager, and the SSL manager requests the actual password value from the password manager for the given OTC token (operation 750).

The password manager, operating in a secure enclave, looks up the securely stored password and verifies its integrity (operation 760). If verified, the password manager then sends the actual password value (an unsealed form of the password) through a secure channel to the SSL manager (operation 770) which is also operating in a secure enclave. Accordingly, the SSL manager replaces the OTC token with the actual password value and submits the request to the web server of the website (operation 780), using a secure (e.g., TLS/SSL) connection.

Figure 8:
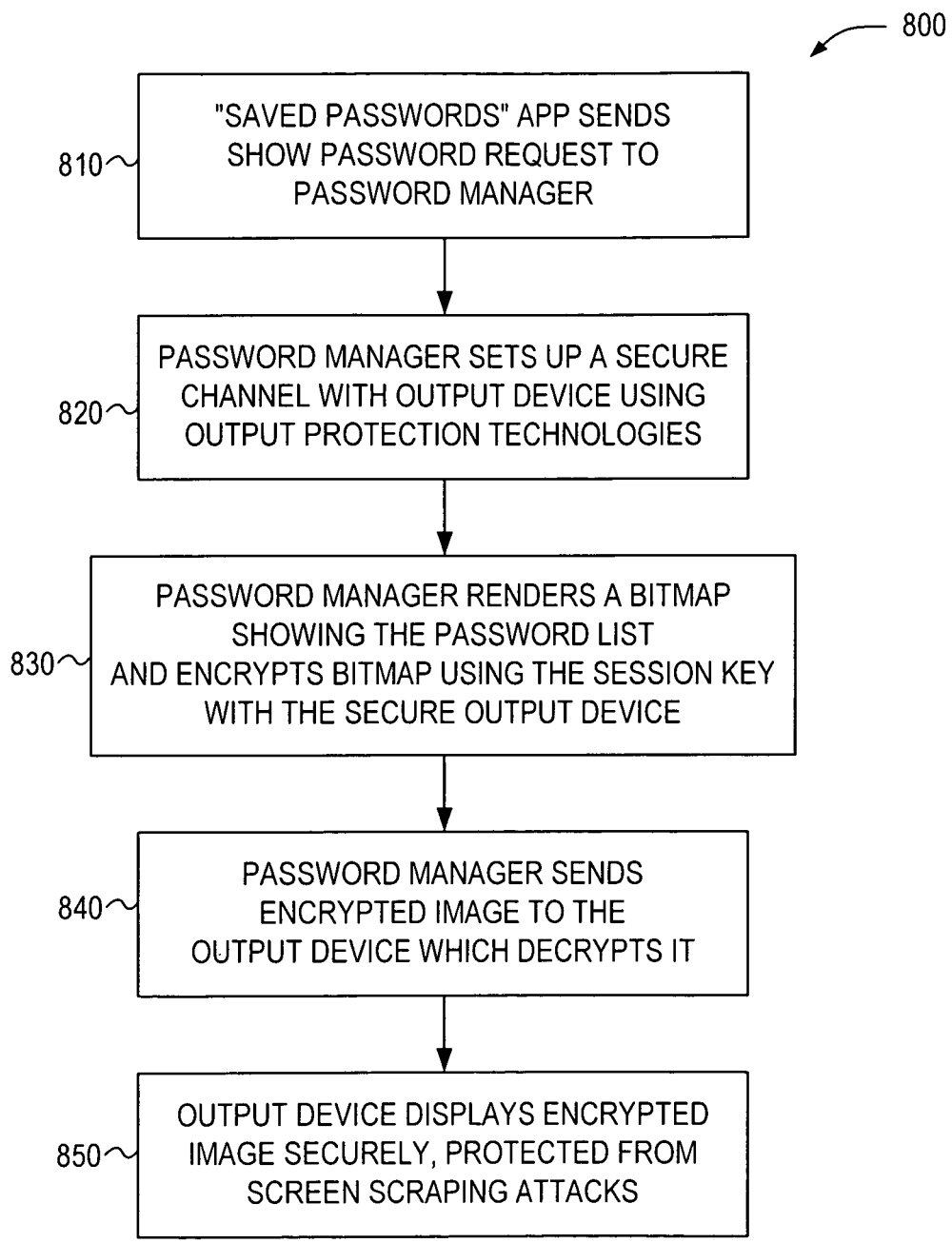
FIG. 8 illustrates a flowchart of data flow operations performed in a web browser for accessing a saved password for display, according to an example.

In addition to the operations of interacting with a website, other operations may be enabled to allow the access and viewing of sensitive data on the local computer. FIG. 8 illustrates a flowchart 800 of data flow operations performed in a web browser for accessing a saved password, according to an implementation example. For example, the flowchart 800 may be used in a data flow for viewing password via "Saved Passwords" web app, in connection with a browser feature to show saved passwords on user command. (As a further example, a "Saved Passwords" function in browser "Settings" may operate as a web application and may include a "Show Password" user interface to display to the user, upon command, the actual unencrypted passwords for URLs that the user has saved.)

The following data flow, illustrated in flowchart 800, may be used to protect the password from being stolen from the application's memory, or from screen scraping attacks intended to steal the password displayed to the user:

First, the "saved passwords" web app sends a "show password" request to the password manager operating in a secure enclave (operation 810). The password manager sets up a secure channel with an output device using output protection technologies such as Protected Audio Video Path (PAVP) or Threadville-Display (operation 820).

The password manager then renders the bitmap showing the password list (in plain text), and encrypts the bitmap using the session key with the secure output device (operation 830). The password manager sends the encrypted image to the output device which decrypts it and displays it securely (operation 840). As a result, the encrypted image is protected from screen scraping attacks while being displayed to the user with the output device (operation 850).

In other examples, data such as passwords may not be directly stored on the local machine, but may be stored remotely. For example, an online password management service (e.g., LastPass®) may be used to consolidate the storage of passwords into a common service. The previously described techniques may be modified to establish a secure communication with the online password management service, which then retrieves and forwards a copy of a secure password, using code running in a secure enclave.

Additionally, in other examples, the presently disclosed authentication techniques may be used in combination with authentication techniques such as biometric verification, physical presence verification, communications from secure input devices, and communication to secure output devices. For example, a computing device may collect input that is dependent on a physical presence of the user, as such data may be forwarded to a web server or other third party remote service. The techniques described above may utilize a trust mechanism to provide guarantees to the secure enclave (or remote service) that an input originated from a trusted input device, or that a human generated the input value. Such trusted input verifications may be combined with the techniques described herein to ensure that a human user is responsible for password generation and access activities.

The presently disclosed authentication techniques also may be augmented by server-side security features, such as the verification of a trusted machine, machine credentials, and improvements to the secure communication channel with the remote service. In an example, a secure browsing connection (TLS/HTTPS) and session may be executed with software operating within a secure enclave, to ensure that all communications from the enclave to the server, and all handling of sensitive data such as credentials and cookies, are kept within an enclave separate from other browser and operating system processes. Other modifications to the presently described techniques and configurations may be implemented through the execution of trusted code and code functions in the respective secure enclaves, the trusted execution environment, or other protected hardware locations.

Figure 9:
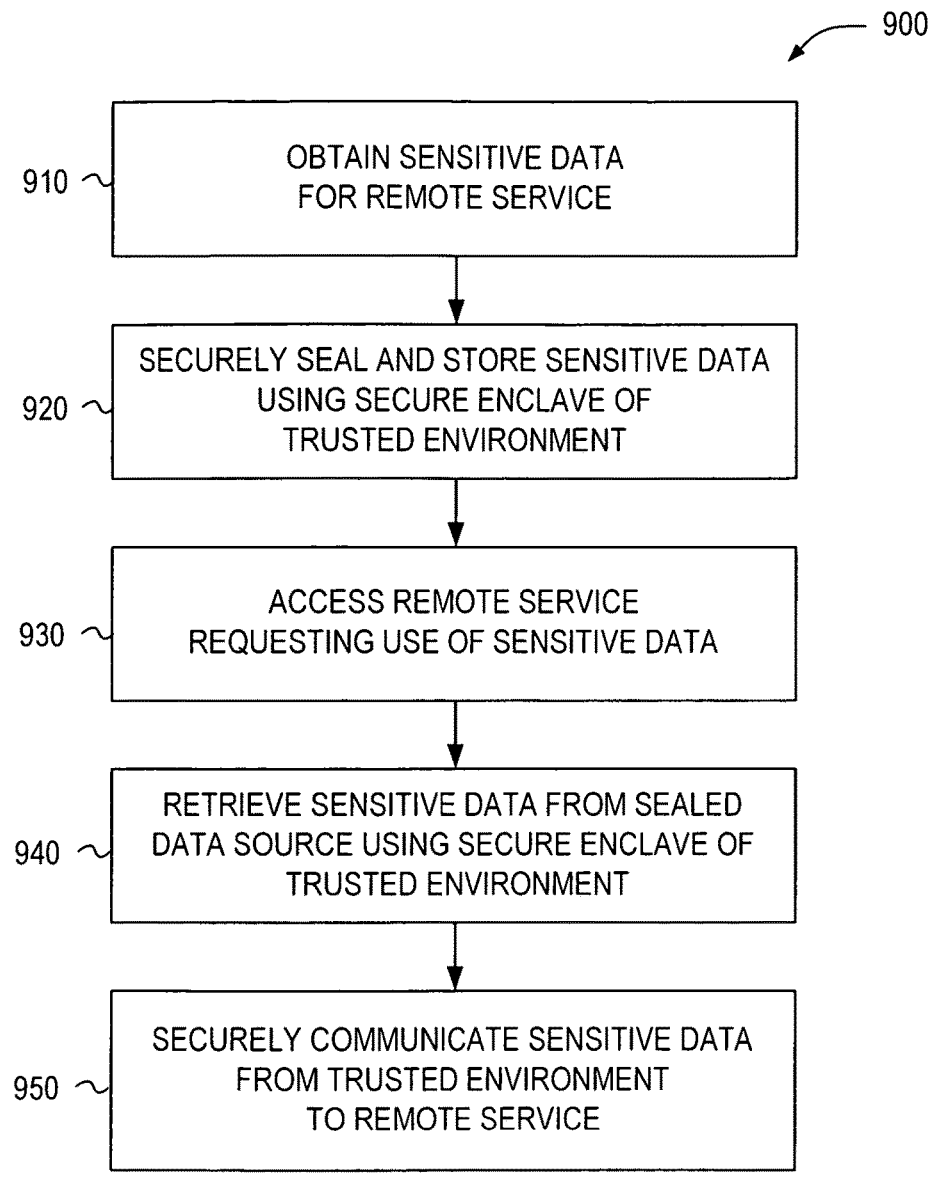
FIG. 9 illustrates a flowchart of operations for storing, accessing, and using sensitive data communicated with a remote service, according to an example.

FIG. 9 illustrates a flowchart 900 of operations for storing, accessing, and using sensitive data communicated with a remote service, according to an example. As shown in the flowchart 900, operations may commence with obtaining sensitive data for a remote service (operation 910) and securely storing sensitive data using a secure enclave of a trusted execution environment (operation 920). In an example, the sensitive data is an existing password known by the remote service, and the existing password is sealed by a secure enclave and stored in a password database responsive to confirmation of a user input in the browser. In another example, the sensitive data is a new password established for the remote service (generated by a process operating in a secure enclave), and the new password is sealed by the secure enclave and stored in a password database responsive to confirmation of the new password being established with the remote service.

The flowchart 900 continues with operations to access the remote service, such as for a remote service requesting the use of the sensitive data (operation 930). For example, this may include the access of a website (or web application within a website) that requests the use of the sensitive data, or a like browser access to the remote service. Accordingly, the request to obtain the sensitive data is processed, verified as appropriate, and the sensitive data is retrieved from a sealed data source using a secure component (e.g., a secure enclave) operating in the trusted execution environment (operation 940).

In an example, such sensitive data may be retrieved, unsealed, and communicated in response to user activity in the browser (e.g., in response to the user inputting a particular user identifier in a login form, in response to the user entering a master password to unlock the sensitive data, or in response to other use activity to select use of a particular set of sensitive data). Upon retrieval of the sensitive data using the secure enclave, operations are then performed to communicate the sensitive data from the trusted execution environment to the remote service (operation 950).

The communication of this data may include the communication of the data via a SSL/TLS encrypted communication session with a remote web service. In some examples, the sensitive data may include a password. In other examples the sensitive data may include a session identifier, cookie, user identifier, two-factor authentication value, cached site data, form data, or token, for use with the remote service. In another example, the data is unable to be retrieved from the secure enclave by non-enclave code, and may be exclusively communicated via a secure communication channel (e.g. SSL/TLS connection) established between the secure enclave and the remote server.

Figure 10:
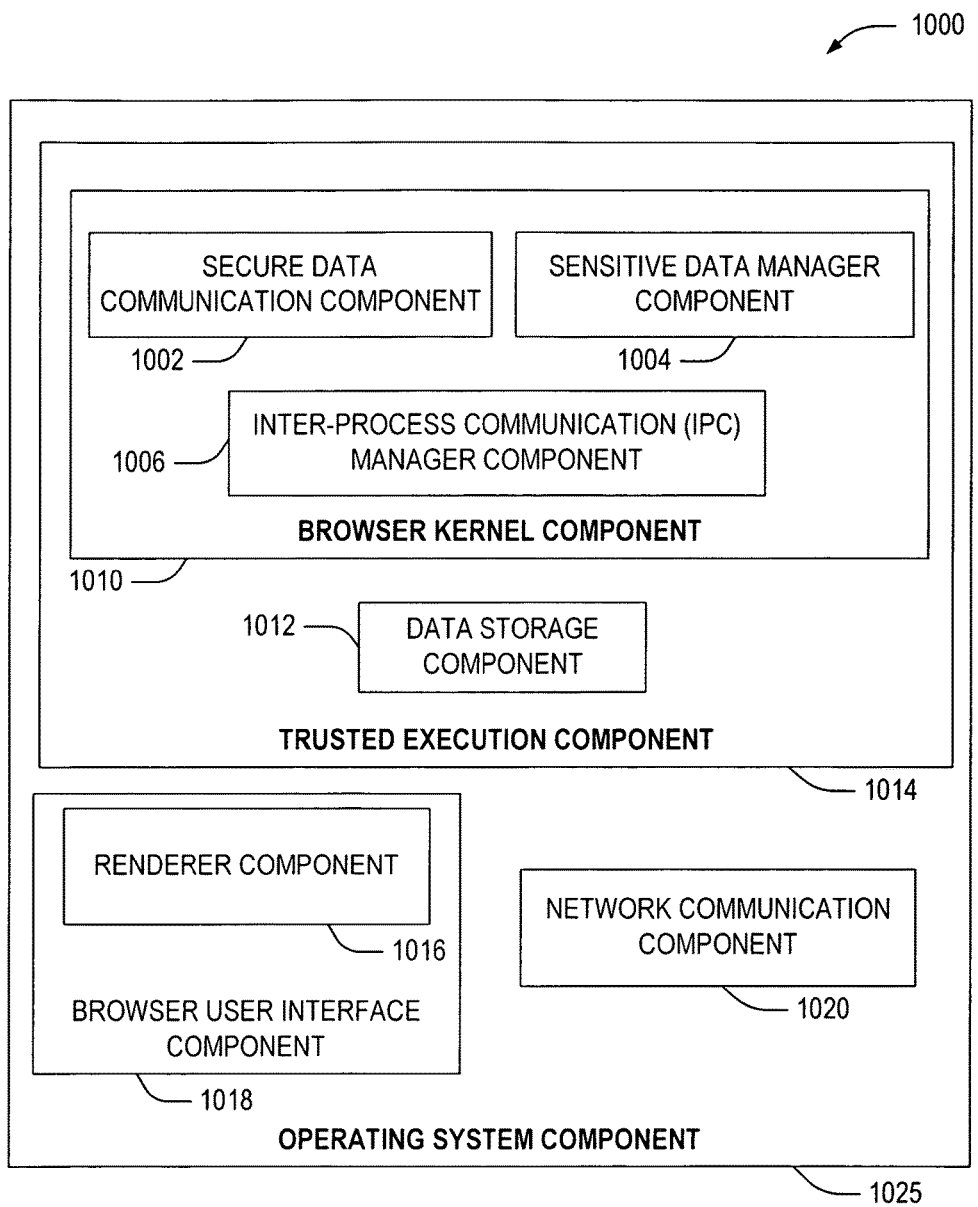
FIG. 10 illustrates a block diagram of components of a computing system configured for storing, accessing, and using sensitive data that is communicated with a remote service, according to an example.

FIG. 10 illustrates a block diagram 1000 of components of a computing system configured for storing, accessing, and using sensitive data that is communicated with a remote service, according to an example. As shown, the computing system includes an operating system component 1025 hosting a series of operable components including a trusted execution component 1014, a browser user interface component 1018, and a network communication component 1020. It will be understood that the configuration of FIG. 10 may include other components of a TEE, browser, operating system, or input/output devices used to facilitate the presently described techniques.

The browser user interface component 1018 includes a browser renderer component 1016, used to render web pages and content in a browser. The network communication component 1020 is used to communicate data with a web server over a network such as the Internet. In some examples, multiple renderer components may be implemented in a browser user interface component 1018, and features of the browser user interface component 1018 may be integrated with features of the network communication component 1020 or the operating system component 1025.

The trusted execution component 1014, for example, may be embodied by a TEE that is implemented with hardware extensions for secure enclaves and related protected code execution, data storage, and memory operations. The trusted execution component 1014 may include a browser kernel component 1010 used for executing trusted code of a browser kernel process, and a data storage component 1012 used for securely storing data for the trusted environment. In the browser kernel component 1010, a series of components for the storage and handling of sensitive data may be provided. These may include a secure data communication component 1002, a sensitive data manager component 1004, and an inter-process communication (IPC) manager component 1006.

The sensitive data manager component 1004 (e.g., a password manager component) may be used, for example, to seal and persist sensitive data to the data storage component 1012, as the sensitive data manager component 1004 operates and seals the data within the trusted execution component 1014 (e.g., a TEE). The secure data communication component 1002, also operating within the trusted execution component 1014, may be used to securely transmit the sensitive data from the trusted execution component 1014 to the remote service using an encrypted connection. Thus, the secure data communication component 1002 may be coupled to the network communication component 1020 of the computing system to conduct network communications with the remote service.

The IPC manager component 1006 may be used to receive a request for the sensitive data from outside the TEE, such as from the browser user interface component 1018, and facilitate communication of the sensitive data to the remote service in response to the request for the sensitive data. For example, the IPC manager component 1006 may be used to communicate a token to the browser renderer component 1016 to substitute for the sensitive data in input form data, and receive a response from the browser renderer component 1016 including the token in the input for the sensitive data; then, the secure data communication component 1002 operates to replace the token in the input form data with the unsealed form of the sensitive data, and cause transmission of the unsealed form of the sensitive data in the input form data to the remote service.

While many of the examples described herein may refer to features of SGX secure enclaves and hardware-enabled features used within Intel® hardware architectures, it will be understood that the techniques may also apply to other architectures and protected software modes implemented by specialized hardware instructions and configurations. For example, the presently described techniques may include use of isolated code and hardware managed secure storage functions in an ARM®-based architecture such as with the implementation of TrustZone® security extensions.

Further, other modifications to trusted execution environments may enact portions of the processing, communication, and storage techniques described herein. The applicability of the techniques described herein is not limited to any particular browser environment, but may apply to browsers including Internet Explorer®, Edge, Safari®, Chrome®, Firefox®, and derivative browsers based on rendering engines of such browsers. In an example discussed herein, the browser kernel itself is modified to provide for the secure communication and storage of data. In other examples, a feature of the operating system, a plug-in, or an additional browser layer may be used to control or manage the security functions disclosed herein.

Figure 11:
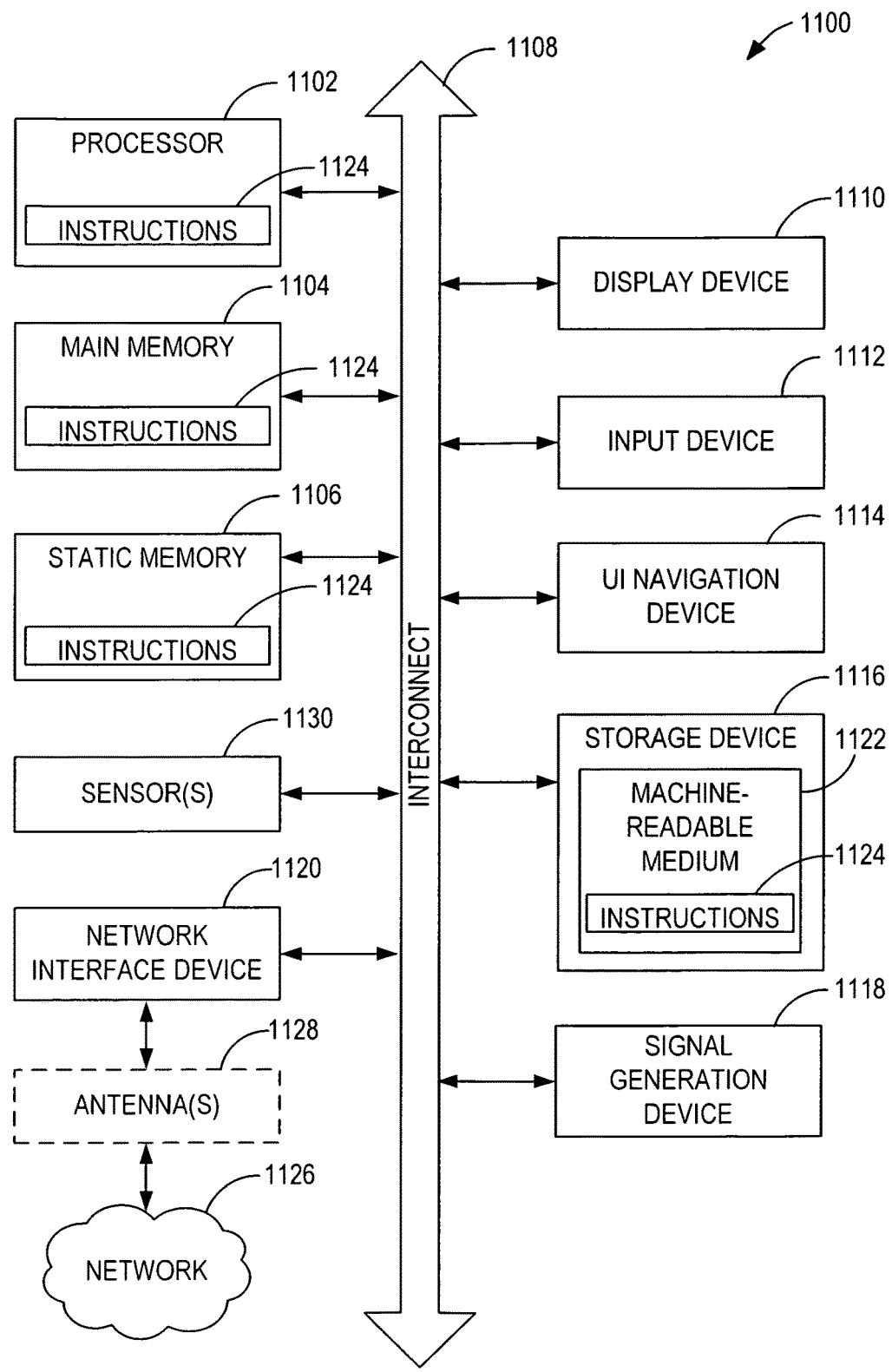
FIG. 11 illustrates a block diagram for an example computer system architecture upon which any one or more of the techniques (e.g., operations, processes, methods, and methodologies) discussed herein may be performed, according to an example.

FIG. 11 is a block diagram illustrating a machine in the example form of a computer system 1100, within which a set or sequence of instructions may be executed to cause the machine to perform any one of the methodologies discussed herein, according to an example embodiment. The machine may be an personal computer (PC), a tablet PC, a hybrid tablet/notebook PC, a personal digital assistant (PDA), a mobile telephone or smartphone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1100 includes at least one processor 1102 (e.g., a central processing unit (CPU), a graphics processing unit (GPU) or both, processor cores, compute nodes, etc.), a main memory 1104 and a static memory 1106, which communicate with each other via an interconnect 1108 (e.g., a link, a bus, etc.). The computer system 1100 may further include a video display unit 1110, an alphanumeric input device 1112 (e.g., a keyboard), and a user interface (UI) navigation device 1114 (e.g., a mouse). In one embodiment, the video display unit 1110, input device 1112 and UI navigation device 1114 are incorporated into a touch screen display. The computer system 1100 may additionally include a storage device 1116 (e.g., a drive unit), a signal generation device 1118 (e.g., a speaker), an output controller 1132, a network interface device 1120 (which may include or operably communicate with one or more antennas 1128, transceivers, or other wireless communications hardware) to communicate with a network 1126, and one or more sensors 1130, such as a global positioning system (GPS) sensor, compass, accelerometer, location sensor, or other sensor.

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the computer system 1100, with the main memory 1104, static memory 1106, and the processor 1102 also constituting machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a computing system, comprising: processing circuitry; a storage memory; a sensitive data manager component, coupled to the processing circuitry and the storage memory, the sensitive data manager component operating in a trusted execution environment (TEE) of the computing system, and the sensitive data manager component to seal and persist sensitive data to the storage memory of the computing system, the sensitive data associated with a remote service; and a secure data communication component, coupled to the sensitive data manager component, the secure data communication component operating in the TEE, and the secure data communication component to transmit the sensitive data from the TEE to the remote service using an encrypted connection; wherein the sensitive data is transmitted to the remote service responsive to user activity in a browser, wherein an unsealed form of the sensitive data is inaccessible within the computing system outside of the TEE.

In Example 2, the subject matter of Example 1 optionally includes an inter process communication (IPC) manager component, the IPC manager component operating in the trusted execution environment, the IPC manager component to receive a request for the sensitive data from outside the TEE, and facilitate communication of the sensitive data to the remote service in response to the request for the sensitive data.

In Example 3, the subject matter of Example 2 optionally includes wherein the request for the sensitive data occurs in a browser renderer component that operates outside of the TEE, wherein the browser renderer component performs rendering of a web page for the remote service, and wherein the web page for the remote service includes an input for the sensitive data, wherein the IPC manager component is further to communicate a token to the browser renderer component as a substitute for the sensitive data within input form data, and receive a response from the browser renderer component including the token in the input form data, and wherein the secure data communication component operates to replace the token in the input form data with the unsealed form of the sensitive data, to cause transmission of the unsealed form of the sensitive data in the input form data.

In Example 4, the subject matter of Example 3 optionally includes wherein the sensitive data is an existing password known by the remote service, and wherein the sensitive data is sealed within the sensitive data manager component.

In Example 5, the subject matter of any one or more of Examples 3-4 optionally include wherein the sensitive data is a new password established for the remote service, and wherein the sensitive data manager component is further to generate the new password, wherein the new password is sealed within the sensitive data manager component and persisted to the storage memory responsive to confirmation of the new password established for the remote service.

In Example 6, the subject matter of any one or more of Examples 3-5 optionally include wherein the sensitive data is an existing password known by the remote service, and wherein the existing password is retrieved by the sensitive data manager component responsive to an indication in the browser of an user identifier associated with the existing password.

In Example 7, the subject matter of any one or more of Examples 2-6 optionally include wherein the sensitive data is an existing password known by the remote service, and wherein the existing password is received in the browser from a first user input, and wherein operations to seal and persist the sensitive data are performed by the sensitive data manager component responsive to a second user input received in the browser that indicates a command to securely store the existing password.

In Example 8, the subject matter of any one or more of Examples 2-7 optionally include wherein the sensitive data manager component, the secure data communication component, and the IPC manager component operate in a browser kernel executed within the trusted execution environment.

In Example 9, the subject matter of any one or more of Examples 1-8 optionally include wherein the sensitive data is associated with a website of the remote service and includes one or more of: a session identifier, cookie, user identifier, password, two-factor authentication value, cached site data, form data, or token, for use with the website.

In Example 10, the subject matter of any one or more of Examples 1-9 optionally include wherein the sensitive data manager component, and the secure data communication component are implemented within the TEE using secure enclaves implemented by specialized hardware instructions.

In Example 11, the subject matter of any one or more of Examples 1-10 optionally include wherein the storage memory persists the sensitive data for a website of the remote service, the sensitive data including a password value associated with a website uniform resource locator (URL) and a user identifier, wherein the password value is stored in the storage memory within a binary object sealed within the sensitive data manager component, wherein the binary object includes a password for the website and a verification hash, the verification hash based on the website URL, the user identifier, and the password.

Example 12 is at least one machine-readable storage medium comprising a plurality of instructions that, responsive to being executed by processing circuitry of a computing system, cause the computing system to perform electronic operations that: securely store sensitive data associated with a remote service, with operations of to seal the sensitive data and persist the sensitive data to a storage memory of the computing system, wherein the electronic operations to seal and persist the sensitive data are performed by code executing within a secure enclave of a trusted execution environment (TEE); and transmit the sensitive data from the TEE to the remote service using an encrypted connection, responsive to user activity in a browser that executes within the computing system, wherein an unsealed form of the sensitive data is inaccessible within the computing system outside of the TEE.

In Example 13, the subject matter of Example 12 optionally includes instructions that cause the computing system to perform electronic operations that: process a browser request to obtain the sensitive data securely stored in the storage memory, the browser request provided from the browser to an application that operates in the secure enclave, wherein the browser executes outside of the TEE; and communicate the sensitive data from the application that operates in the secure enclave to the remote service using the encrypted connection responsive to the browser request to obtain the sensitive data.

In Example 14, the subject matter of Example 13 optionally includes instructions that cause the computing system to perform electronic operations, with the TEE, that: communicate a token to the browser, responsive to the browser request to obtain the sensitive data; receive input form data for a web page rendered by the browser, wherein the input form data includes the token in an input field for the sensitive data; and replace the token in the input form data With the unsealed form of the sensitive data; wherein the electronic operations that transmit the sensitive data to the remote service using the encrypted connection include transmission of the unsealed form of the sensitive data in the input form data, using the encrypted connection; and wherein browser operations to generate the browser request to obtain the sensitive data and to render the web page occur outside of the TEE.

In Example 15, the subject matter of Example 14 optionally includes wherein the sensitive data is an existing password known by the remote service, and wherein the existing password is sealed by code executing within the secure enclave.

In Example 16, the subject matter of any one or more of Examples 14-15 optionally include instructions that cause the computing system to perform electronic operations that: generate the sensitive data in the TEE, wherein the sensitive data is a new password established for the remote service, and wherein the new password is sealed by code executing within the secure enclave and persisted to the storage memory responsive to confirmation of the new password established for the remote service.

In Example 17, the subject matter of any one or more of Examples 14-16 optionally include instructions that cause the computing system to perform electronic operations that: retrieve the sensitive data from the storage memory by code executing within the secure enclave, the sensitive data retrieved responsive to an indication in the browser of an user identifier associated with the sensitive data, wherein the sensitive data is an existing password known by the remote service.

In Example 18, the subject matter of any one or more of Examples 12-17 optionally include wherein the sensitive data is an existing password known by the remote service, wherein the existing password is received in the browser from a first user input, and wherein the electronic operations to seal and persist the sensitive data are performed by code executing within the secure enclave responsive to a second user input received in the browser that indicates a command to securely store the existing password.

In Example 19, the subject matter of any one or more of Examples 12-18 optionally include wherein the sensitive data is associated with a website of the remote service and includes one or more of: a session identifier, cookie, user identifier, password, two-factor authentication value, cached site data, form data, or token, for use with the website.

In Example 20, the subject matter of any one or more of Examples 12-19 optionally include wherein the electronic operations to securely store the sensitive data and transmit the sensitive data are performed by components of a trusted browser kernel executed within the TEE.

In Example 21, the subject matter of any one or more of Examples 12-20 optionally include wherein the TEE is implemented with a plurality of secure enclaves implemented by specialized hardware instructions.

In Example 22, the subject matter of any one or more of Examples 12-21 optionally include wherein the storage memory persists the sensitive data for a website of the remote service, the sensitive data including a password value associated with a website uniform resource locator (URL) and a user identifier, wherein the password value is stored in the storage memory within a binary object that is sealed by code executing within the secure enclave, wherein the binary object includes a password for the website and a verification hash, the verification hash based on the website URL, the user identifier, and the password.

Example 23 is a method, comprising electronic operations, which when performed by circuitry of a computing system, causes the computing system to perform the electronic operations including: securely storing sensitive data associated with a remote service, by sealing and persisting the sensitive data to a storage memory of the computing system, wherein the sealing and persisting of the sensitive data is performed by code executing within a secure enclave of a trusted execution environment (TEE); and transmitting the sensitive data from the TEE to the remote service using an encrypted connection, responsive to user activity in a browser that executes within the computing system, wherein an unsealed form of the sensitive data is inaccessible within the computing system outside of the TEE.

In Example 24, the subject matter of Example 23 optionally includes the electronic operations further including: processing a browser request to obtain the sensitive data securely stored in the storage memory, the browser request provided from the browser to an application operating in the secure enclave, wherein the browser executes outside of the TEE; and communicating the sensitive data from the application operating in the secure enclave to the remote service using the encrypted connection responsive to the browser request to obtain the sensitive data.

In Example 25, the subject matter of Example 24 optionally includes the electronic operations further including operations performed with the TEE including: communicating a token to the browser, responsive to the browser request to obtain the sensitive data; receiving input form data for a web page rendered by the browser, the input form data including the token in an input field for the sensitive data; and replacing the token in the input form data with the unsealed form of the sensitive data; wherein transmitting the sensitive data to the remote service using the encrypted connection includes transmission of the unsealed form of the sensitive data in the input form data, using the encrypted connection; and wherein browser operations to generate the browser request to obtain the sensitive data and to render the web page occur outside of the TEE.

In Example 26, the subject matter of Example 25 optionally includes wherein the sensitive data is an existing password known by the remote service, and wherein the existing password is sealed by code executing within the secure enclave.

In Example 27, the subject matter of any one or more of Examples 25-26 optionally include the electronic operations further including: generating the sensitive data in the TEE, wherein the sensitive data is a new password established for the remote service, and wherein the new password is sealed by code executing within the secure enclave and persisted to the storage memory responsive to confirmation of the new password established for the remote service.

In Example 28, the subject matter of any one or more of Examples 25-27 optionally include the electronic operations further including: retrieving the sensitive data from the storage memory using code executing within the secure enclave, the sensitive data retrieved responsive to an indication in the browser of an user identifier associated with the sensitive data, wherein the sensitive data is an existing password known by the remote service.

In Example 29, the subject matter of any one or more of Examples 23-28 optionally include wherein the sensitive data is an existing password known by the remote service, wherein the existing password is received in the browser from a first user input, and wherein sealing and persisting the sensitive data are performed by code executing within the secure enclave responsive to a second user input received in the browser that indicates a command to securely store the existing password.

In Example 30, the subject matter of any one or more of Examples 23-29 optionally include wherein the sensitive data is associated with a website of the remote service and includes one or more of: a session identifier, cookie, user identifier, password, two-factor authentication value, cached site data, form data, or token, for use with the website.

In Example 31, the subject matter of any one or more of Examples 23-30 optionally include wherein the electronic operations for securely storing the sensitive data and transmitting the sensitive data are performed by components of a trusted browser kernel executed within the TEE.

In Example 32, the subject matter of any one or more of Examples 23-31 optionally include wherein the TEE is implemented with a plurality of secure enclaves implemented by specialized hardware instructions.

In Example 33, the subject matter of any one or more of Examples 23-32 optionally include wherein the storage memory persists the sensitive data for a website of the remote service, the sensitive data including a password value associated with a website uniform resource locator (URL) and a user identifier, wherein the password value is stored in the storage memory within a binary object sealed by code executing within the secure enclave, the binary object including a password for the website and a verification hash, the verification hash based on the website URL, the user identifier, and the password.

Example 34 is a machine-readable medium including instructions, which when executed by a computing system, cause the computing system to perform any of the methods of Examples 23-33.

Example 35 is an apparatus comprising means for performing any of the methods of Examples 23-33.

Example 36 is at least one machine-readable storage medium comprising a plurality of instructions that, responsive to being executed by processing circuitry of a computing system, cause the computing system to perform electronic operations comprising: receiving a request from a browser to generate a password; generating the password with a password manager component, the password manager component operated in a first hardware-managed secure enclave of the computing system; and sealing and storing the password in a memory storage location of the computing system associated with the first hardware-managed secure enclave.

In Example 37, the subject matter of Example 36 optionally includes the electronic operations further comprising: rendering a registration field of a web page in the browser, wherein the request from the browser to generate the password is generated responsive to user input in the browser with the registration field of the web page.

In Example 38, the subject matter of any one or more of Examples 36-37 optionally include the electronic operations further comprising: generating a one time code token associated with the password; inserting the one time code token in place of the password within a registration field of a web page in the browser; exchanging the one time code token for the password with a secure communication component, the secure communication component operated in a second hardware-managed secure enclave of the computing system; and transmitting the password from the secure communication component to a web server hosting the web page.

Example 39 is at least one machine-readable storage medium comprising a plurality of instructions that, responsive to being executed by processing circuitry of a computing system, cause the computing system to perform electronic operations comprising: receiving input in a browser from a user of a password; presenting a prompt to the user to store the password; and in response to a confirmation of the prompt, storing the password using a hardware-managed secure enclave of the computing system.

In Example 40, the subject matter of Example 39 optionally includes the electronic operations further comprising: rendering a registration field of a web page in the browser, wherein the input received in the browser is received in the registration field of the web page, and wherein the prompt presented to the user to store the password occurs in response to submission of the registration field of the web page in the browser.

Example 41 is at least one machine-readable storage medium comprising a plurality of instructions that, responsive to being executed by processing circuitry of a computing system, cause the computing system to perform electronic operations comprising: receiving input in a browser from a user of a user identifier; determining that a password associated with the user identifier is sealed and stored by a password manager component, the password manager component operating in a hardware-managed secure enclave; retrieving the password using the password manager component; and transmitting the password to a web server.

In Example 42, the subject matter of Example 41 optionally includes the electronic operations further comprising: rendering a login field of a web page in the browser, the web page hosted by the web server, wherein the input received in the browser is received from the user in the login field of the web page.

In Example 43, the subject matter of any one or more of Examples 41-42 optionally include the electronic operations further comprising: generating a one time code token associated with the password; inserting the one time code token in place of the password within a login field of a web page, the web page hosted by the web server; exchanging the one time code token for the password with a secure session component, the secure session component operated in a second hardware-managed secure enclave of the computing system; and wherein transmitting the password to the web server includes transmitting the password from the secure session component to the web server.

Example 44 is at least one machine-readable storage medium comprising a plurality of instructions that, responsive to being executed by processing circuitry of a computing system, cause the computing system to perform electronic operations comprising: receiving a request to show one or more passwords in a user interface, wherein the one or more passwords are sealed by a hardware-managed secure enclave of the computing system; and rendering an encrypted bitmap, the encrypted bitmap including the one or more passwords in the user interface.

In Example 45, the subject matter of Example 44 optionally includes the electronic operations further comprising: establishing a secure channel with an output device configured to display the user interface; and outputting the encrypted bitmap to the output device using the secure channel.

Example 46 is a method executed by at least one processor of a computing system, the method comprising the electronic operations included in any of Examples MRM_A1-45.

Example 47 is an apparatus comprising means for performing any of the electronic operations of Examples MRM_A1-45.

Example 48 is a computing system, comprising: processor circuitry; a memory operably coupled to the processor circuitry; a data storage enclave configured with operation of the processor circuitry and the memory; a browser component comprising instructions implemented with the processor circuitry and the memory; and a security component comprising instructions implemented with the processor circuitry and the memory; wherein the browser component and the security component are configured to use the data storage enclave to cause the computing system to perform any of the methods of Examples MRM_A1-MRM_D2.

Example 49 is a computing system, comprising: at least one processor; at least one memory operably coupled to the processor; a rendering component operably coupled to the processor and the memory and configured to render a registration field of a web page in a browser; a receiving component operably coupled to the processor and the memory and configured to receive a request in the browser to generate a password; a password generation component operably coupled to the processor and the memory and configured to generate the password; and a password storage component operably coupled to the processor and the memory and configured to seal and store the password with a hardware-managed secure enclave of the computing system.

In Example 50, the subject matter of Example 49 optionally includes a token management component operably coupled to the processor and the memory and configured to: generate a one time code token associated with the password; insert the one time code token in place of the password within the registration field of the web page in the browser; and exchange the one time code token for the password with a secure session component, the secure session component operated in a second hardware-managed secure enclave of the computing system; and a transmitting component configured to transmit the password from the secure session component to a web server hosting the web page.

Example 51 is a computing system, comprising: at least one processor; at least one memory operably coupled to the processor; a rendering component operably coupled to the processor and the memory and configured to render a login field of a web page in a browser; an user input processing component operably coupled to the processor and the memory and configured to receive data input in the browser from a user of a user identifier in the login field; a password retrieval component operably coupled to the processor and the memory and configured to determine that a password associated with the user identifier is sealed and stored by a hardware-managed secure enclave, and retrieve the password using the hardware-managed secure enclave; and a transmitting component operably coupled to the processor and the memory and configured to transmit the password to a web server hosting the web page.

In Example 52, the subject matter of Example 51 optionally includes a token management component operably coupled to the processor and the memory and configured to: generate a one time code token associated with the password; insert the one time code token in place of the password within the login field of the web page in the browser; exchange the one time code token for the password with a secure session component, the secure session component operated in a second hardware-managed secure enclave of the computing system; and wherein the transmitting component is further configured to transmit the password to the web server by transmitting the password from the secure session component to the web server hosting the web page.

Example 53 is an apparatus, comprising: means for securely storing sensitive data associated with a remote service, to seal and persist the sensitive data, wherein operations to seal and persist the sensitive data is performed within a trusted execution environment (TEE); and means for transmitting the sensitive data to the remote service using an encrypted connection, responsive to user activity in a browser, wherein an unsealed form of the sensitive data is inaccessible outside of the TEE.

In Example 54, the subject matter of Example 53 optionally includes means for processing a browser request to obtain the sensitive data that is sealed and persisted, wherein the browser executes outside of the TEE.

In Example 55, the subject matter of Example 54 optionally includes means for communicating a token to the browser, responsive to the browser request to obtain the sensitive data; means for processing input form data for a web page rendered by the browser, the input form data including the token in an input field for the sensitive data; and means for replacing the token in the input form data with the unsealed form of the sensitive data, and transmitting the unsealed form of the sensitive data in the input form data, using the encrypted connection.

In Example 56, the subject matter of any one or more of Examples 53-55 optionally include means for generating the sensitive data in the TEE, wherein the sensitive data is a new password established for the remote service, and wherein the new password is sealed persisted responsive to confirmation of the new password established for the remote service.

In Example 57, the subject matter of any one or more of Examples 53-56 optionally include means for retrieving the sensitive data in the TEE, the sensitive data retrieved responsive to an indication in the browser of an user identifier associated with the sensitive data, wherein the sensitive data is an existing password known by the remote service.

In Example 58, the subject matter of any one or more of Examples 53-57 optionally include means for implementing the TEE with a plurality of secure enclaves using specialized hardware instructions.

In Example 59, the subject matter of any one or more of Examples 53-58 optionally include means for persisting the sensitive data for a website of the remote service, the sensitive data including a password value associated with a website uniform resource locator (URL) and a user identifier, wherein the password value is stored within a sealed binary object, the sealed binary object including a password for the website and a verification hash, the verification hash based on the website URL, the user identifier, and the password.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. At least one non-transitory machine-readable storage medium comprising a plurality of instructions that, responsive to being executed by processing circuitry of a computing system, cause the computing system to perform electronic operations that:
securely store sensitive data associated with a remote service using a sensitive data manager component, with operations to seal the sensitive data and persist the sensitive data to a storage memory of the computing system, wherein the electronic operations to seal and persist the sensitive data are performed by first code executing within a first secure enclave of a trusted execution environment (TEE);
retrieve and decrypt the sensitive data from the storage memory, with the sensitive data manager component, using second code executing within a second secure enclave of the TEE;
communicate the sensitive data, from the sensitive data manager component to a secure communication manager, using a secure channel in the TEE;
transmit, with the secure communication manager, the sensitive data from the TEE to the remote service using an encrypted connection established by the secure communication manager, responsive to user activity in a browser that executes within the computing system, wherein the secure storage and the secure channel prevents an unencrypted or unsealed form of the sensitive data from being accessed within the computing system outside of the TEE;
process a browser request to obtain the sensitive data securely stored in the storage memory, the browser request provided from the browser to an application, wherein the browser executes outside the TEE;
communicate the sensitive data from the application to the remote service using the encrypted connection responsive to the browser request to obtain sensitive data;
communicate, via the TEE, a token to the browser, responsive to the browser request to obtain sensitive data;
receive, at the TEE, input form data for a web page rendered by the browser, wherein the input form data includes the token in an input field for the sensitive data; and
replace, via the TEE, the token in the input form data with the unsealed form of the sensitive data.

2. The machine-readable storage medium of claim 1,
wherein the electronic operations that transmit the sensitive data to the remote service using an encrypted connection include transmission of the unsealed form of the sensitive data from input form data of the web page, using the encrypted connection; and
wherein browser operations to generate the browser request to obtain the sensitive data and to render the web page occur outside of the TEE.

3. The machine-readable storage medium of claim 2, wherein the sensitive data is an existing password known by the remote service, and wherein the existing password is sealed by the first code executing within the first secure enclave.

4. The machine-readable storage medium of claim 2, further comprising instructions that cause the computing system to perform electronic operations that:
generate the sensitive data in the TEE, wherein the sensitive data is a new password established for the remote service, and wherein the new password is sealed by the first code executing within the first secure enclave and persisted to the storage memory responsive to confirmation of the new password established for the remote service.

5. The machine-readable storage medium of claim 2, further comprising instructions that cause the computing system to perform electronic operations that:
retrieve the sensitive data from the storage memory by the second code executing within the second secure enclave, the sensitive data retrieved responsive to an indication in the browser of an user identifier associated with the sensitive data, wherein the sensitive data is an existing password known by the remote service.

6. The machine-readable storage medium of claim 1, wherein the sensitive data is an existing password known by the remote service, wherein the existing password is received in the browser from a first user input, and wherein the electronic operations to seal and persist the sensitive data are performed by the first code executing within the first secure enclave responsive to a second user input received in the browser that indicates a command to securely store the existing password.

7. The machine-readable storage medium of claim 1, wherein the sensitive data is associated with a website of the remote service and includes one or more of: a session identifier, cookie, user identifier, password, two-factor authentication value, cached site data, form data, or token, for use with the website.

8. The machine-readable storage medium of claim 1, wherein the electronic operations to securely store the sensitive data and transmit the sensitive data are performed by components of a trusted browser kernel executed within the TEE.

9. The machine-readable storage medium of claim 1, wherein the TEE is implemented with a plurality of secure enclaves implemented by specialized hardware instructions.

10. The machine-readable storage medium of claim 1, wherein the storage memory persists the sensitive data for a website of the remote service, the sensitive data including a password value associated with a website uniform resource locator (URL) and a user identifier, wherein the password value is stored in the storage memory within a binary object that is sealed by the first code executing within the first secure enclave, and wherein the binary object includes a password for the website and a verification hash, the verification hash based on the website URL, the user identifier, and the password.

11. A computing system, comprising:
processing circuitry;
a storage memory;
a sensitive data manager component, coupled to the processing circuitry and the storage memory, the sensitive data manager component operating in a trusted execution environment (TEE) of the computing system using code executing within a secure enclave of the TEE, and the sensitive data manager component to seal and persist sensitive data to a storage memory of the computing system, and to retrieve and decrypt the sensitive data from the storage memory of the computing system, the sensitive data associated with a remote service;
a secure data communication component, communicatively coupled to the sensitive data manager component, the secure data communication component operating in the TEE, and the secure data communication component to transmit the sensitive data from the TEE to the remote service using an encrypted connection; and a communication component, communicatively coupled to the sensitive data manager component and the secure data communication component, the communication component operating in the TEE, and the communication component to communicate the sensitive data from the sensitive data manager component to the secure data communication component, using a secure channel within the TEE; and
an inter process communication (IPC) manager component, the IPC manager component operating in the TEE, the IPC manager component to receive a request for the sensitive data from outside the TEE, and facilitate communication of the sensitive data to the remote service in response to the request for the sensitive data, and wherein the request for the sensitive data occurs in a browser renderer component that operates outside of the TEE;
wherein the IPC manager component is further to communicate a token to the browser renderer component as a substitute for the sensitive data within input form data, and receive a response from the browser renderer component including the token in the input form data;
wherein the sensitive data is transmitted to the remote service responsive to user activity in a browser, wherein an unsealed form of the sensitive data is inaccessible within the computing system outside of the TEE;
wherein the secure data communication component operates to replace the token received in the input form data with the unsealed form of the sensitive data, to cause transmission of the unsealed form of the sensitive data via the TEE; and
wherein the sensitive data manager component, the secure data communication component, and the communication component prevents an unencrypted or unsealed form of the sensitive data from being accessed within the computing system outside of the TEE.

12. The computing system of claim 11, wherein the browser renderer component performs rendering of a web page for the remote service, and wherein the web page for the remote service includes an input for the sensitive data.

13. The computing system of claim 12, wherein the sensitive data is an existing password known by the remote service, and wherein the sensitive data is sealed within the sensitive data manager component.

14. The computing system of claim 12, wherein the sensitive data is a new password established for the remote service, and wherein the sensitive data manager component is further to generate the new password, wherein the new password is sealed within the sensitive data manager component and persisted to the storage memory responsive to confirmation of the new password established for the remote service.

15. The computing system of claim 12, wherein the sensitive data is an existing password known by the remote service, and wherein the existing password is retrieved by the sensitive data manager component responsive to an indication in the browser of an user identifier associated with the existing password.

16. The computing system of claim 11, wherein the sensitive data is an existing password known by the remote service, and wherein the existing password is received in the browser from a first user input, and wherein operations to seal and persist the sensitive data are performed by the sensitive data manager component responsive to a second user input received in the browser that indicates a command to securely store the existing password.

17. The computing system of claim 11, wherein the sensitive data manager component, the secure data communication component, and the IPC manager component operate in a browser kernel executed within the trusted execution environment.

18. The computing system of claim 11, wherein the sensitive data is associated with a website of the remote service and includes one or more of: a session identifier, cookie, user identifier, password, two-factor authentication value, cached site data, form data, or token, for use with the website.

19. The computing system of claim 11, wherein the sensitive data manager component, and the secure data communication component are implemented within the TEE using secure enclaves implemented by specialized hardware instructions.

20. The computing system of claim 11, wherein the storage memory persists the sensitive data for a website of the remote service, the sensitive data including a password value associated with a website uniform resource locator (URL) and a user identifier, wherein the password value is stored in the storage memory within a binary object sealed within the sensitive data manager component; wherein the binary object includes a password for the website and a verification hash, the verification hash based on the website URL, the user identifier, and the password.

21. A method, comprising electronic operations, which when performed by circuitry of a computing system, causes the computing system to perform the electronic operations including:
securely storing sensitive data associated with a remote service, by sealing and persisting the sensitive data to a storage memory of the computing system using a sensitive data manager component, wherein the sensitive data is associated with a remote service, and wherein the sealing and persisting of the sensitive data is performed by first code executing within a first secure enclave of a trusted execution environment (TEE);
retrieve and decrypt the sensitive data from the storage memory, with the sensitive data manager component, using second code executing within a second secure enclave of the TEE;
communicate the sensitive data, from the sensitive data manager component to a secure communication manager, using a secure channel in the TEE;
transmitting, with the secure communication manager, the sensitive data from the TEE to the remote service using an encrypted connection established by the secure communication manager, responsive to user activity in a browser that executes within the computing system, wherein the secure storage and the secure channel prevents an unencrypted or unsealed form of the sensitive data from being accessed within the computing system outside of the TEE;
processing a browser request to obtain the sensitive data securely stored in the storage memory, the browser request provided from the browser to an application, wherein the browser executes outside of the TEE;
communicating the sensitive data from the application to the remote service using encrypted connection responsive to the browser request to obtain the sensitive data;
communicating, via the TEE, a token to the browser, responsive to the browser request to obtain the sensitive data;
receiving, at the TEE, input form data for a web page rendered by the browser, wherein the input form data includes the token in an input field for the sensitive data; and
replacing, via the TEE, the token in the input form data with the unsealed form of the sensitive data.

22. The method of claim 21,
wherein transmitting the sensitive data to the remote service using the encrypted connection includes transmission of the unsealed form of the sensitive data from input form data of the web page, using the encrypted connection; and
wherein browser operations to generate the browser request to obtain the sensitive data and to render the web page occur outside of the TEE.

* * * * *

UNITED STATES PATENT AND TRADEMARK OFFICE
CERTIFICATE OF CORRECTION

PATENT NO. : 10,462,135 B2
APPLICATION NO. : 14/757659
DATED : October 29, 2019
INVENTOR(S) : Varadarajan et al.

Page 1 of 1

It is certified that error appears in the above-identified patent and that said Letters Patent is hereby corrected as shown below:

In the Claims

In Column 25, Line 24, in Claim 20, delete "component;" and insert --component,-- therefor In Column 26, Line 21, in Claim 21, after "using", insert --the--

Signed and Sealed this
Twenty-first Day of July, 2020

Andrei Iancu
*Director of the United States Patent and Trademark Office*